(12) United States Patent
Tan et al.

(10) Patent No.: US 7,706,163 B2
(45) Date of Patent: Apr. 27, 2010

(54) THREE-LEVEL AC GENERATING CIRCUIT AND CONTROL METHOD THEREOF (75) Inventors: Jing-Tao Tan, Shanghai (CN); Qiu-Hua Zhu, Shanghai (CN); Chang-Zan Ma, Shanghai (CN); De-Gang Yi, Shanghai (CN); Wen-Yin Tsai, Taoyuan Hsien (TW); Jian-Ping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 280 days.

(21) Appl. No.: 11/845,877

(22) Filed: Aug. 28, 2007

(65) Prior Publication Data
US 2008/0112200 A1 May 15, 2008

(30) Foreign Application Priority Data
Nov. 10, 2006 (TW) .............................. 95141749 A (51) Int. Cl.
*H02M 7/5387* (2007.01)
(52) U.S. Cl. ......................................... 363/132; 363/37
(58) Field of Classification Search .................. 363/34, 363/39, 41, 43, 56.01, 58, 96, 98, 131, 132; 318/647, 797, 801, 822, 492; 307/64, 66, 307/110
See application file for complete search history.

(56) References Cited

U.S. PATENT DOCUMENTS

| 5,361,196 A | * | 11/1994 | Tanamachi et al. ............. 363/41 |
| 5,661,390 A | * | 8/1997 | Lipo et al. .................. 318/803 |
| 7,005,759 B2 | * | 2/2006 | Ying et al. ..................... 307/64 |

OTHER PUBLICATIONS

Topological and Modulation Design of a Buck-Boos Three-Level Dual Inverter, F. Gao, P.C. Loh, D.M. Vilathgamuwa, F. Blaabjerg, C.K. Goh and J.Q. Zhang, IEEE Indus. Elec. IECON 2006, 32nd Annual Conf., Nov. 6-10, 2006, pp. 2408-2413.

* cited by examiner

*Primary Examiner*—Rajnikant B Patel
(74) *Attorney, Agent, or Firm*—Volpe And Koenig, P.C.

(57) ABSTRACT

The present invention provides a three-level ac generating circuit and the control method thereof. The three-level ac generating circuit includes a three-level boosting circuit connected to an input source and including a positive boosting portion and a negative boosting portion; and a three-level inverting circuit connected to the three-level boosting circuit and including a positive inverting portion and a negative inverting portion, wherein while the input source is a relative low voltage, the relatively low voltage is boosted via the three-level boosting circuit, inverted and output via the three-level inverting circuit; while the input source is a relatively high voltage, the relatively high voltage is inverted and output via the three-level inverting circuit and
  wherein the output of the three-level ac generating circuit is power grid.

21 Claims, 9 Drawing Sheets

Fig.11

THREE-LEVEL AC GENERATING CIRCUIT AND CONTROL METHOD THEREOF

FIELD OF THE INVENTION

The present invention relates to a three-level AC generating circuit and the control method thereof, and more particular to a three-level ac generating circuit for a solar power generation system, a fuel battery and a wind power generation system which have the wide rage of the input voltage variation.

BACKGROUND OF THE INVENTION

It is the trend of the energy development to balance the energy, the environment and the economics. Furthermore, there are many drawbacks of the traditional centralized power generation technology. In comparison with the centralized power generation technology, the advantages of the distributed power generation technology are the flexible power generation, the environment protection, etc. The distributed power generation technology not only meets the requirements of the power system and the user, but also provides the flexibility, the reliability and the economical value.

Currently, the solar power generation system, the fuel battery and the wind power generation system are the main distributed power generation systems. The distributed power generation technology can be independently operated or be operated with the power generation system. The distributed power generation technology is operated in the place without the power grid. The distributed power generation technology is operated with the power generation system in the area with the increased loading. The ac generating circuit is the important part of the distributed power generation system.

Figure 1A:
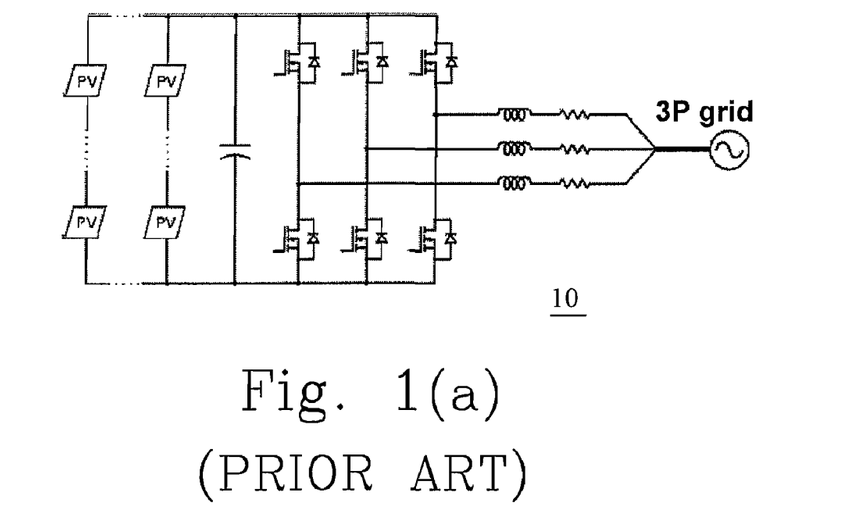
FIG. 1(a) shows a three-level ac generating circuit in the prior art.

Please refer to FIG. 1(a) showing the three-level ac generating circuit according to the prior art. Since the three-level ac generating circuit 10 is a single-stage circuit, the three-level ac generating circuit 10 has higher efficiency but needs higher battery voltage.

Figure 1B:
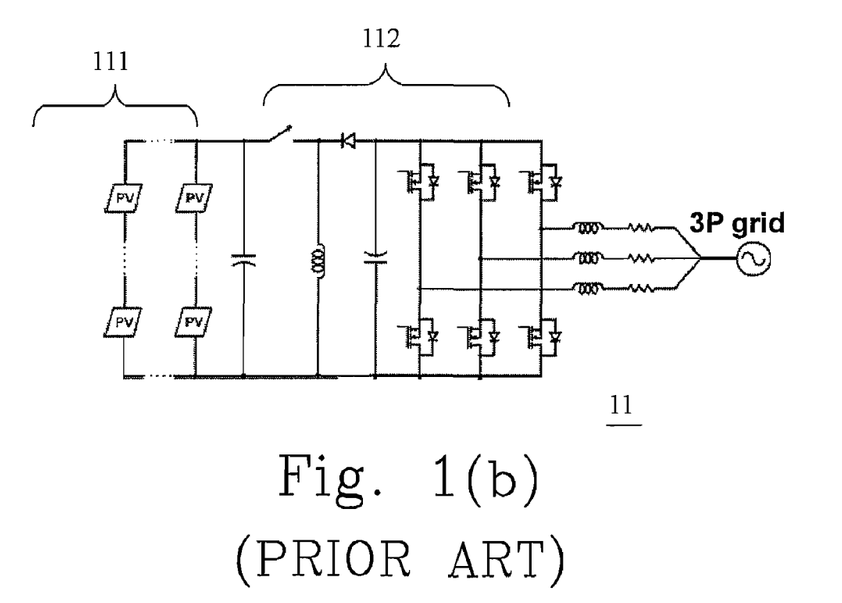
FIG. 1(b) shows another three-level ac generating circuit in the prior art.

Please refer to FIG. 1(b) showing another three-level ac generating circuit according to the prior art. The three-level ac generating circuit 11 is a two-stage circuit. The battery voltage is converted into a predetermined value via the pre-converter 111, and then output via the post-inverter 112. Typically, the typical pre-converter 111 is a boost circuit or a buck-boost circuit.

The circuit shown in FIG. 1(b) has the expanded variation of the input voltage, but the drawbacks thereof are those the efficiency is low and many interferences are formed from the capacitor. In addition, the traditional half-bridge structure is used in the post-inverter 112, and the efficiency is low while the high voltage is applied to the post-inverter 112. The traditional half-bridge switch component has the anti-parallel diode as the continuous loop, so that while the switch component is conducted, the reverse recovery is performed by the anti-parallel diode. The MOSFET is not used as the switch component for minimizing the loss from the reverse recovery since the parasitic diode property of the MOSFET is not good enough even though the MOSFET has the conduction property of the resistance and good switch property. The switch loss of the system cannot be minimized by using the MOSFET as the switch component.

Generally, the three-level inverting circuit is used for the device with the high direct current input voltage but not the device with the low voltage. The voltage endurance capability of the switch component is decreased by the three-level inverting circuit, so that the efficiency of the device with the high voltage having the three-level inverting circuit is increased; therefore, the three-level inverting circuit is generally used in the fields of the uninterrupted power system and the motor driving. In the fields of the uninterrupted power system and the motor driving, the output terminal of the three-level inverting circuit is connected to the power-consuming device, and the load characteristic of the power-consuming device is changed along with the operation status of the power-consuming device. It means that the output voltage and the current phase of the three-level inverting circuit are changeable, i.e. there may be dual directions of the energy transportation.

Figure 2A:
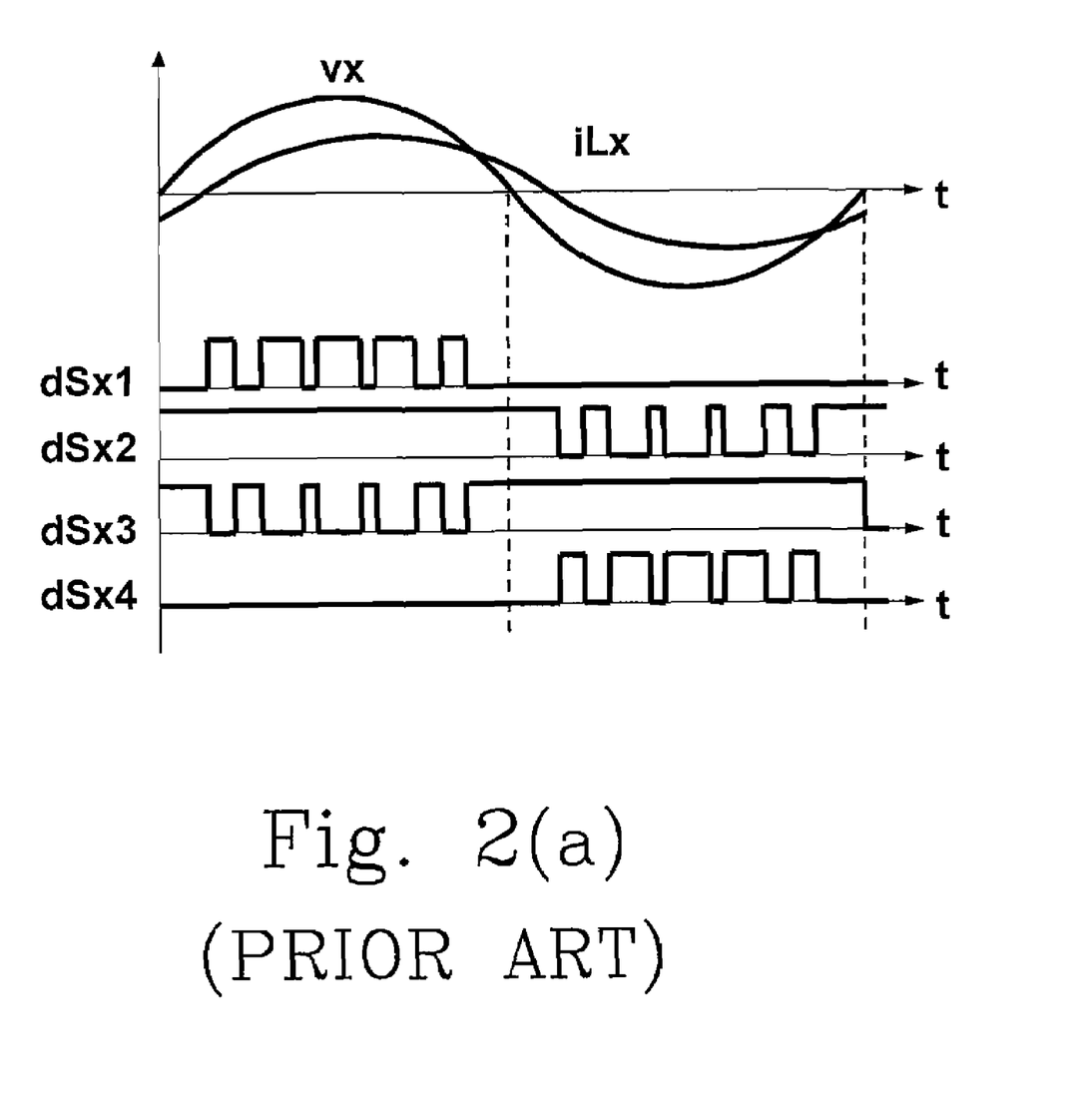
FIG. 2(a) is an oscillogram showing the driving signals for driving the four switches by the single phase three-level inverting circuit with the inductance load.

Please refer to FIG. 2(a), which is the oscillogram showing the driving signals for driving the four switches by the single phase three-level inverting circuit with the inductance load. The switch components Sx1 and Sx2 are main control components, and the switch components Sx2 and Sx3 have the driving signals complementary to the diving signals of the switch components Sx4 and Sx1, respectively. FIGS. 2(b)-2(e) are circuits showing the three-level inverting circuit operating at different statuses.

Figure 2B:
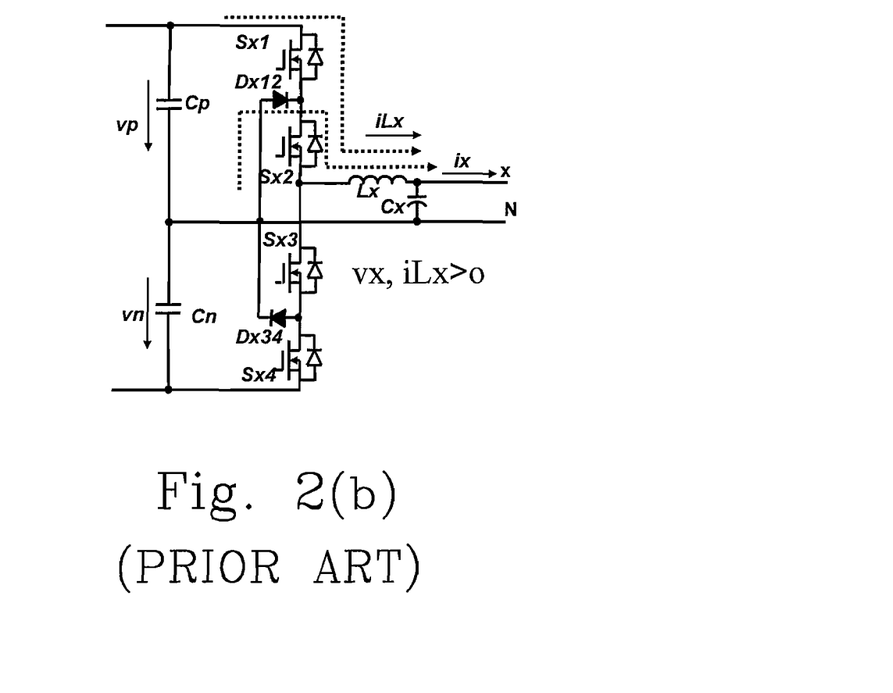
FIGS. 2(b)-2(e) show the three-level inverting circuit operating in different statuses.
Figure 2C:
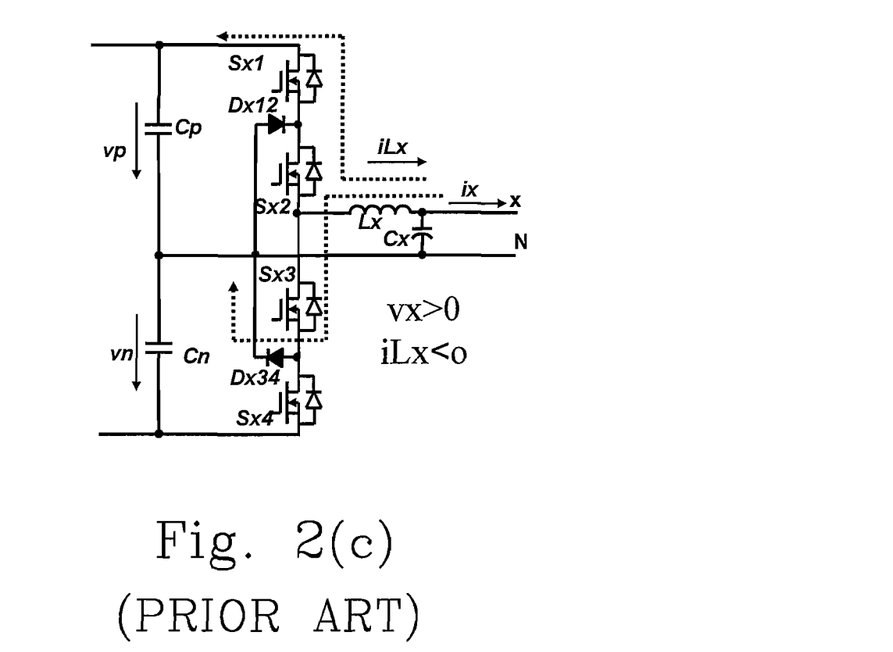
Figure 2D:
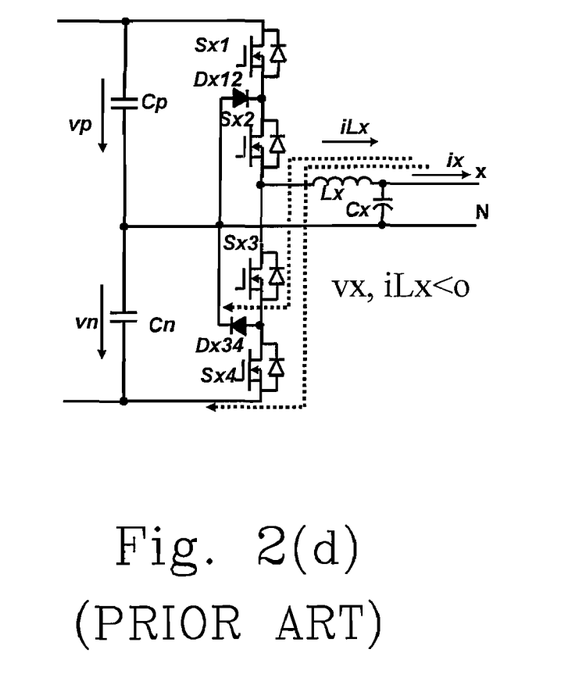

FIG. 2(b) and FIG. 2(d) are circuits showing the three-level inverting circuit in the modes of the energy transportation. In FIG. 2(b), the switch component Sx1 is switched at high frequency and has the driving signal complementary to the driving signal of the switch component Sx3, the switch component Sx2 is normal on, and the switch component Sx4 is normal off. While the switch component Sx1 is conducted, the energy is transported from the input terminal via the switch components Sx1 and Sx2 and the inductor Lx to the output terminal. While the switch component is off, the inductor current iLx passes through the diode Dx12 and the switch component Sx2.

The operation procedure shown on FIG. 2(d) is similar to that shown on FIG. 2(b).

Figure 2E:
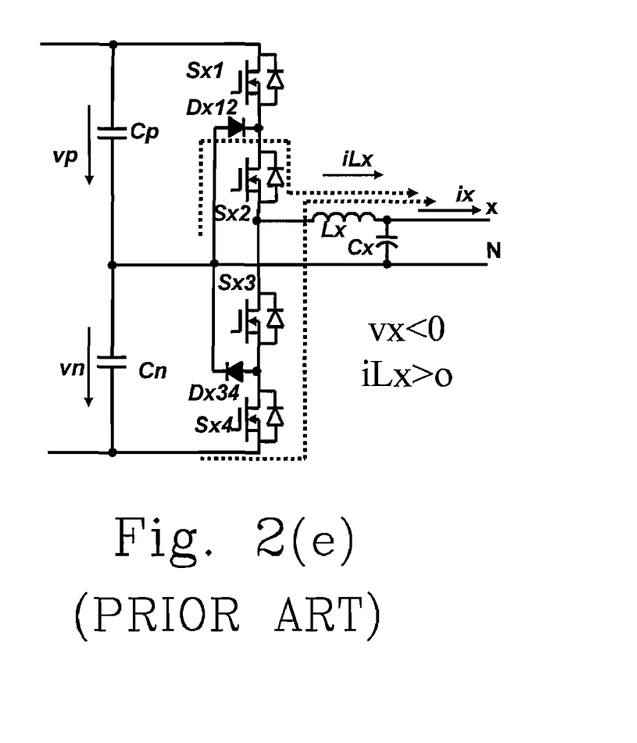

FIG. 2(c) and FIG. 2(e) are circuits showing the three-level inverting circuit in the mode of the energy feedback. In FIG. 2(c), the switch component Sx1 is switched at high frequency and has the driving signal complementary to the driving signal of the switch component Sx3, the switch component Sx2 is normal on, and the switch component Sx4 is normal off. While the switch component Sx1 is conducted, the inductor current iLx is negative, so that the current passes through the diode anti-parallel to the switch components Sx1 and Sx2, and the energy is feedback from the output terminal to the input terminal. While the switch component Sx1 is off and the switch component Sx3 is conducted, the inductor current iLx passes through the switch component Sx3 and the diode Dx34.

The operation procedure shown on FIG. 2(e) is similar to that shown on FIG. 2(c).

According to the above analyses, while the three-level inverting circuit is in the mode of the energy transportation (for example, as shown in FIG. 2(b)), the switch component Sx3 is not the component for passing through the current, so that the switch component Sx3 is switched at low frequency, i.e. the switch frequency is equal to the frequency of output voltage. While the three-level inverting circuit is in the mode of energy feedback, the switch component Sx3 is as the component for passing through the current, so that the switch component Sx3 has to be switched at high frequency. In addition, there are the energy transportation mode and the energy feedback mode in the fields of the uninterrupted power system and the motor driving, i.e. there are dual directions of the energy transportation, so that the switch component Sx3 has to be switched at high frequency. Similarly, the switch component Sx2 also has to be switched at high frequency.

In addition, while the three-level inverting circuit is in the mode of the energy feedback (for example, as shown FIG. 2(c)), the current passes through the diode anti-parallel to the switch components Sx1 and Sx2, so that while the switch component Sx1 is off and the switch component Sx3 is conducted, the diode anti-parallel to the switch components Sx1 and Sx2 is reversely recovered. There is the parasitic diode in the MOSFET, and the reverse recovery characteristic of the parasitic diode is very bad, so that while the three-level inverting circuit is used in the fields of the uninterrupted power system and the motor driving, the MOSFET is generally not used as the switch component. The MOSFET is not used as the switch component for minimizing the loss from the reverse recovery since the parasitic diode property of the MOSFET is not good enough even though the MOSFET has the conduction property of the resistance and good switch property.

In addition, since the power systems, such as the solar battery and the fuel battery, have the wide range of the voltage variation of the direct current power source, wherein the highest input voltage may be several times (for example, more than 3 times)of the lowest input voltage, the three-level inverting circuit cannot be directly used in the power system.

In order to overcome the disadvantages of the prior art described above, the present invention provides a three-level AC generating circuit and the control method thereof.

SUMMARY OF THE INVENTION

It is an aspect of the present invention to provide a three-level AC generating circuit including a three-level boosting circuit and a here-level inverting circuit. The MOSFET is used as the switch component in the inverting circuit, so as to increase the efficiency of the inverting circuit. According to the voltage polarity of the power system and the circuit portion which is practically operated, the AC generating circuit is divided into a positive half portion and a negative half portion. The positive half portion and the negative half portion are respectively considered as a first boost-buck circuit and a second boost-buck circuit, so as to respectively produce the positive and negative half circuit waves for the power system.

The three-level AC generating circuit is very useful for the device with the wide range of the input voltage variation.

As in the low voltage mode with the lower input voltage, the input voltage is boosted by the boosting circuit, and then optimized and operated by the inverting circuit so as to be output. In this mode, the inverting circuit has the phase with the minimal absolute value of the voltage to be switched at high frequency, and the switch components having the remaining two phases are operated at low frequency, so that the inverting circuit has higher efficiency.

As in the high voltage mode with the higher input voltage, the boosting circuit is normal on, and the input voltage is switched at high frequency via the inverting circuit so as to be output. The boosting circuit only has the conduction loss, so as to have higher efficiency.

In the present invention, there is an intermediate voltage mode between the high voltage mode and the low voltage mode. In the intermediate voltage mode, the positive half portion and the negative half portion are operated in different modes, i.e. the positive half portion is in the high voltage mode and the negative half portion is in the low voltage mode, or the positive half portion is in the low voltage mode and the negative half portion is in the high voltage mode.

The three-level ac generating circuit is operated in different operation modes along with the variation of the voltage. However, the three-level ac generating circuit has three switch components at most which are switched at high frequency in any operation mode, so that the three-level ac generating circuit has very high efficiency in the full range of the input voltage.

In another aspect, the present invention provides a control method for seamlessly switching the three-level ac generating circuit among the high voltage mode, the intermediate voltage mode and the low voltage mode.

In accordance with the present invention, it is not necessary for the capacitor on the dc bus to be the intermediate energy storage, so that the capacitor with small capacity can be used. Since it is not necessary to use the storage components such as the electrolytic capacitor, the volume and the cost of the system can be reduced and the reliability and the operation life can be significantly increased.

In the present invention, the dc input energy source can be selected from the solar battery, the fuel battery, the wind power system and the regular battery, and the three-level ac generating circuit can be used in the three-phase three-wire system and the three-phase four-wire system.

The above aspects and advantages of the present invention will become more readily apparent to those ordinarily skilled in the art after reviewing the following detailed description and accompanying drawings, in which:

DETAILED DESCRIPTION OF THE PREFERRED EMBODIMENT

The invention is described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 3:
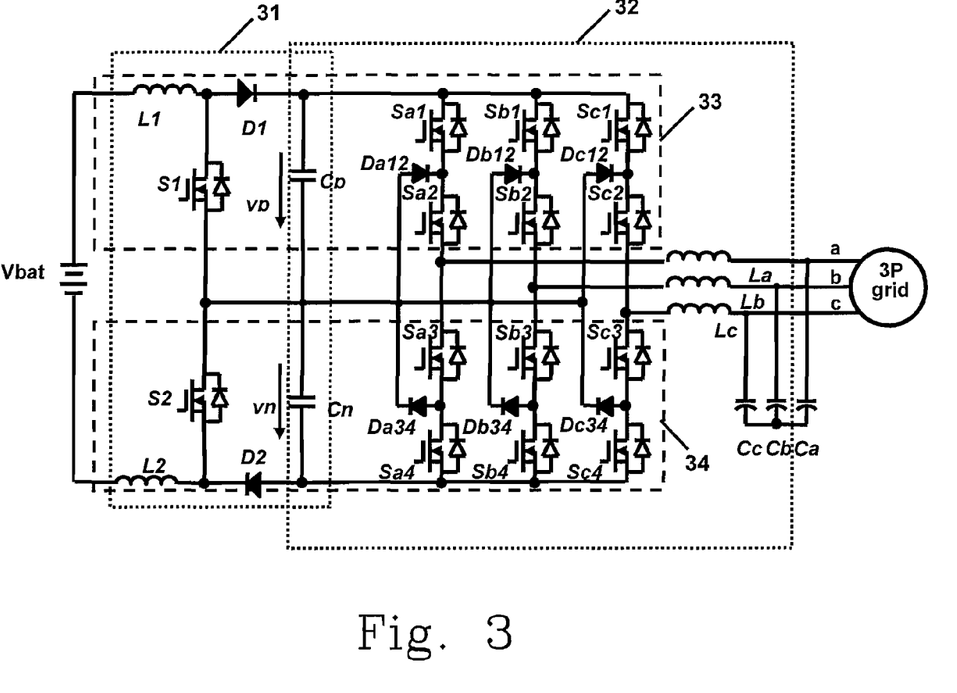
FIG. 3 shows the three-level ac generating circuit according to the first embodiment of the present invention.

Please refer to FIG. 3 showing the three-level ac generating circuit according to the first embodiment of the present invention. In FIG. 3, the three-level ac generating circuit 30 is composed of the three-level boosting circuit 31 and the three-level inverting circuit 32, wherein the three-level boosting circuit 31 is connected to the input source Vbat and includes a positive boosting portion and a negative boosting portion, and the three-level inverting circuit 32 is connected to the three-level boosting circuit 31 and includes a positive inverting portion and a negative inverting portion. The output of the three-level ac generating circuit is power grid. The first boost-buck circuit 33 is composed of the positive boosting portion and the positive inverting circuit for outputting a positive half circuit wave, and the second boost-buck circuit 34 is composed of the negative boosting portion and the negative inverting portion for outputting a negative half circuit wave.

In the first embodiment shown in FIG. 3, the three-level boosting circuit 31 includes two inductors L1 and L2 respectively connected to the high voltage end and the low voltage end of the input source Vbat (since the inductors L1 and L2 are connected in series, the implementations other than this embodiment may include the circuit without one of the inductances L1 and L2). In addition, the three-level boosting circuit 31 includes the switch component S1 and the switch component S2 connected in series via the first midpoint and connected between the inductors L1 and L2. Furthermore, the three-level boosting circuit 31 includes the capacitors Cp and Cn connected in series via the second midpoint. The capacitors Cp and Cn are parallel to the switch components S1 and S2 via the switch components D1 and D2 (diodes in FIG. 3), wherein the reverse parallel connection of the switch components D1 and D2 is positioned and the first midpoint is connected to the second midpoint.

The three-level inverting circuit 32 includes the capacitors Cp and Cn and three inverters connected to one another.

Take the inverter at the left side on FIG. 3 for example. The inverter includes the switch components Da12 and Da34 (diodes in FIG. 3) connected in series at the reverse direction via the third midpoint. The other end of the switch component Da12 is connected to the fourth midpoint between the switch components Sa1 and Sa2 (metal oxide semiconductor field effect transistor in FIG. 3). The other end of the switch component Da34 is connected to the fifth midpoint between the switch components Sa3 and Sa4 (metal-oxide-semiconductor field-effect transistor in FIG. 3). The third midpoint is connected to the second midpoint, and the sixth midpoint between the switch components Sa2 and Sa3 is used for providing the single phase output a. The similar structure can be used for another two inverters for respectively providing the single outputs b and c.

The three-level ac generating circuit 30 is suitable for wide range of the input voltage. When the input voltage is lower to be the low voltage mode, the voltage is boosted by the boosting circuit 31, optimized and then output by the inverting circuit 32. When the input voltage is higher to be the high voltage mode, the voltage is not switched at high frequency, but is switched by the inverting circuit 32 so as to be output.

In addition, there is the intermediate voltage mode between the high voltage mode and the low voltage mode. In the intermediate voltage mode, the first boost-buck circuit 33 of the positive half portion and the second boost-buck circuit 34 of the negative half portion are operated in different modes, i.e. while the first boost-buck circuit 33 of the positive half portion is in the high voltage mode, the second boost-buck circuit 34 of the negative half portion is in the low voltage mode, or while the first-buck circuit 33 of the positive half portion is in the low voltage mode, the second boost-buck circuit 34 of the negative half portion is in the high voltage mode. In the following descriptions of the control method, the ac generating circuit 30 can be seamlessly switched among the high voltage mode, the intermediate voltage mode and the low voltage mode, so that the whole system is easily operated and reliable.

The three-level ac generating circuit 30 is illustrated as follows. In order to simplify the descriptions, the a, b and c phases are denoted as x, i.e. x means a, b or c phase.

In the three-level inverting circuit 32 consisting of the MOSFET, the voltage stress of the three-level inverting circuit 32 is only half of the conventional half-bridge circuit, so that the topology of the present invention is useful for increasing the efficiency of the system. In the condition using the three-level ac generating circuit 30, in order to minimize the disadvantageous influences on the power grid, the circuit wave into the power grid is controlled so as to minimize the harmonic waves; on the other hand, the current phase into the power grid is controlled to synchronize the current phase ans the voltage of the power grid, so as to minimize the introduction of the reactive current. Generally, while the output power of the three-level ac generating circuit is a certain level, the current ix introduced into the power grid is much more than the current passing through the output filter capacitor. It means that the magnitude and the phase of the inductor current iLx and the output current ix are similar.

In another aspect, if the capacitor current is ignored, the inductor current iLx and the voltage vx of the power grid have the same phase. It means that there is the energy transmission mode in the inverting circuit. As illustrated in the prior art, while there is only the energy transmission mode in the three-level inverting circuit 32, the switch components Sx2 and Sx3 are switched at low frequency, wherein the switching frequency is identical to the frequency of the output voltage. Since there is no energy feedback mode, it is not necessary to use the reverse parallel connection of diodes as the continuous current diodes, so that the MOSFET can be used as the switch component; therefore, the conduction loss and the switch loss of the inverting circuit can be significantly reduced.

Figure 4:
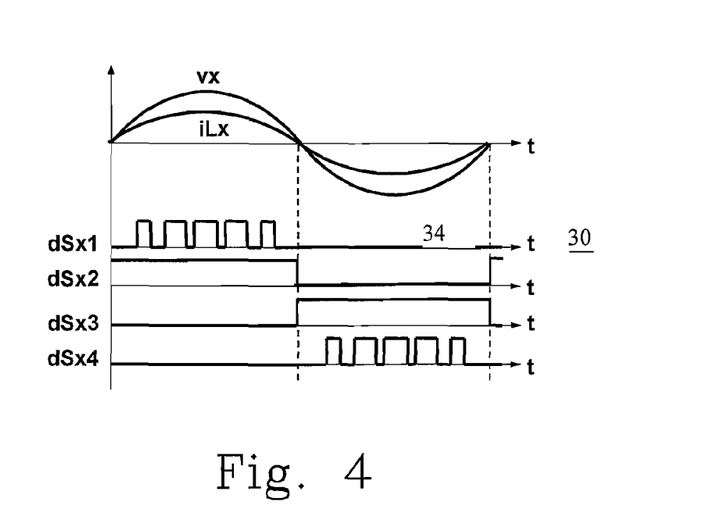
FIG. 4 is an oscillogram showing the driving signals of the four switch components with the single phase of the three-level inverting circuit 32 shown in FIG. 3.

FIG. 4 is an oscillogram showing the driving signals of the four switch components with the single phase of the three-level inverting circuit 32 shown in FIG. 3, wherein the time is shown on the transverse axis, and the output voltage vx and the current iLx of the inductance Lx are correspondingly shown on the vertical axis. The Sx2 and Sx3 are the switch components at low frequency, and the Sx1 and Sx4 are the main component of the positive inverting portion and the negative inverting portion, respectively. There are only two operation conditions, i.e. the condition of vx>0 and iLx>0 and the condition of vx<0 and iLx<0 for the three-level inverting circuit 32.

In the condition of vx>0 and iLx>0, the operation of the inverting circuit 32 is shown in FIG. 2(b), wherein the switch component Sx1 is switched at high frequency, the switch component Sx2 is normal on and the switch components Sx3 and Sx4 are normal off. While the switch component Sx1 is conducted, the energy from the input end passes through the switch components Sx1 and Sx2 and inductor Lx to the power grid. While the switch component Sx1 is off, the inductor current iLx is the continuous current passing through the diode Dx12.

In the condition of vx<0 and iLx<0, the operation of the inverting circuit 32 is shown as FIG. 2(d), wherein the switch component Sx4 is switched at high frequency, the switch component Sx3 is normal on, and the switch components Sx1 and Sx2 are normal off. While the switch component Sx4 is conducted, the energy from the input end passes through the switch components Sx3 and Sx4 and inductor Lx to the power grid. While the switch component Sx4 is off, the inductor current iLx is the continuous current passing through the diode Dx34.

According to the above analyses, the reverse parallel diodes of the switch components Sx1, Sx2, Sx3 and Sx4 without passing current therethrough, so that there is no problem of the reverse recovery for the reverse parallel diodes. Therefore, the MOSFET can be used as the switch component in the present invention. Although the parasite diode property of the MOSFET is bad, there is no phenomenon of the reverse recovery. Since there is the resist property of the MOSFET conduction, the conduction loss of the MOSFET can be significantly reduced by using the switch components in parallel. In comparison with the controllable component (such as IGBT), the MOSFET has better properties of the switch component, the switch loss of the MOSFET can be significantly reduced. Therefore, the MOSFET is used in the present invention for significantly increasing the system efficiency on the conduction loss and the switch loss.

(1) High Voltage Mode

Figure 5:
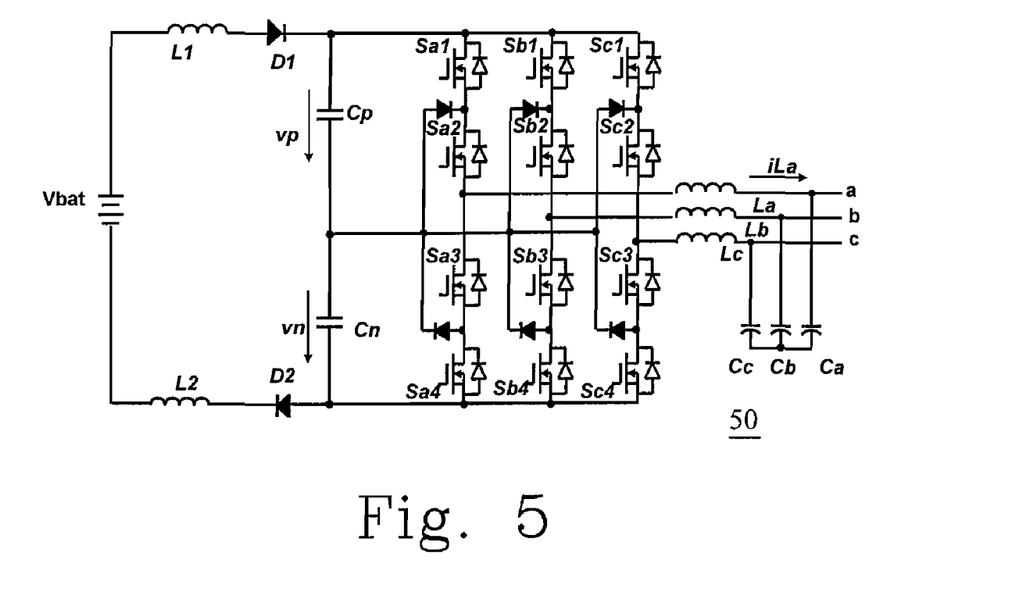
FIG. 5 is an equivalent circuit showing the three-level ac generating circuit shown in FIG. 3 in the high voltage mode.

The input voltage is higher in the high voltage mode. In this mode, the boosting circuit 31 is conducted, and the input voltage is switched at high frequency and then output via the inverting circuit 32. FIG. 5 is an equivalent circuit showing the three-level ac generating circuit shown in FIG. 3 in the high voltage mode. In this mode, the switch components S1 and S2 of the boosting circuit 31 is normal off, and the current directly passes through the inductors L1 and L2 and the diodes D1 and D2. Therefore, there is only the conduction loss without switch loss in the boosting circuit 31, and the inverting circuit 32 is normally switched.

According to above analyses, the operation of each switch in the high voltage mode is as follows.

The switch component S1 and S2 are normal on:

while vx>0, the switch component Sx1 is switched at high frequency, the switch component Sx2 is normal off, and the switch components Sx3 and Sx4 are normal on; and while vx<0, the switch component Sx4 is switched at high frequency, the switch component Sx3 is normal off, and the switch components Sx1 and Sx2 are normal on.

In the high voltage mode, there are only three switch components to be switched at high frequency at any time, so that the system efficiency is higher.

(2) Low Voltage Mode

The input voltage is lower in the low voltage mode. The input voltage is boosted by the boosting circuit 31, modulated and then output via the inverting circuit 32. In the low voltage mode, the boosting circuit 31 and the inverting circuit 21 are switched at high frequency, and optimized so as to increase the system efficiency.

Figure 6A:
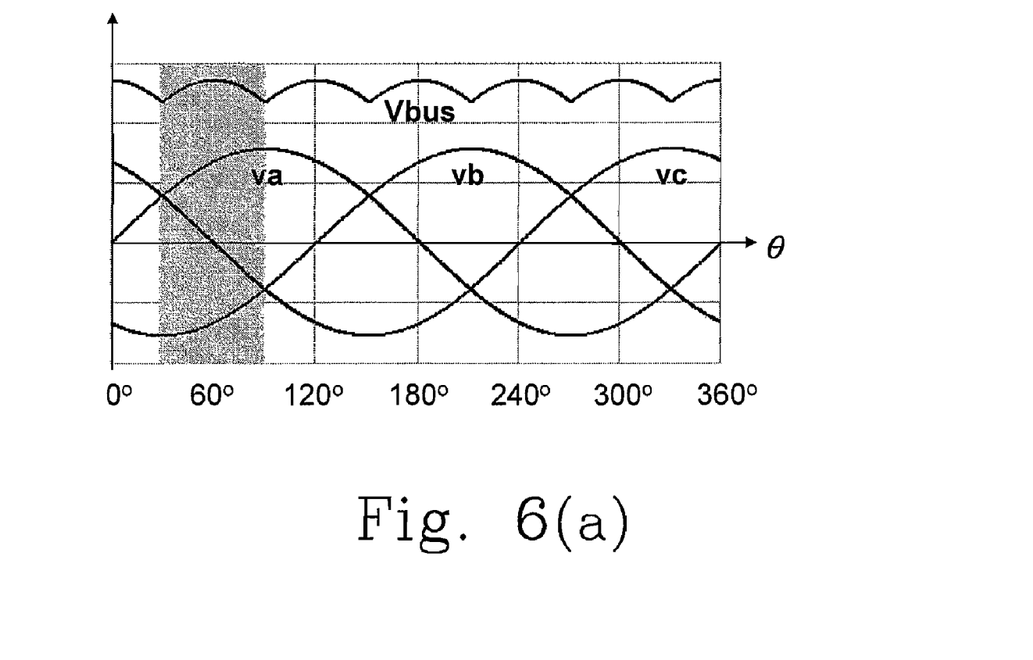
FIG. 6(a) shows the voltage waves of the three-level power system and all the bus voltages of the three-level ac generating circuit shown in FIG. 3 in the low voltage mode.

FIG. 6(a) shows the voltage waves of the three-level power system and all the bus voltages (Vbus=vp+vn) of the three-level ac generating circuit shown in FIG. 3 in the low voltage mode, wherein a period is shown on the transverse axis. The operation in the low voltage mode between 30 degrees and 90 degrees is illustrated as follows.

Figure 6B:
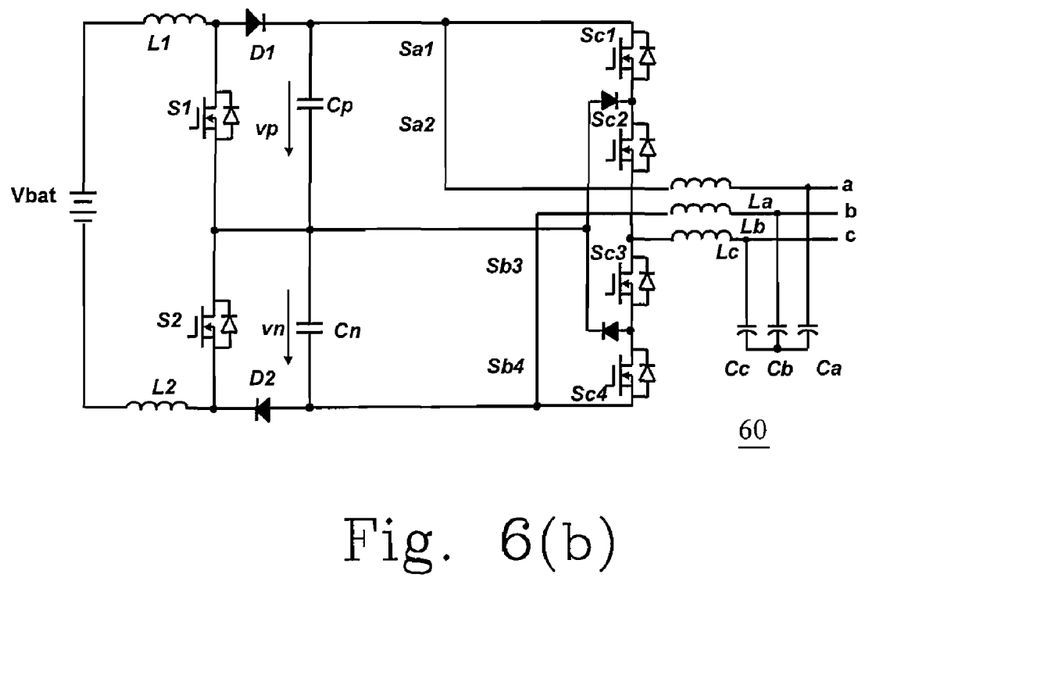
FIG. 6(b) is an equivalent circuit of the three-level ac generating circuit shown in FIG. 3 in the low voltage mode between 30 degrees and 90 degrees.

FIG. 6(b) is an equivalent circuit of the three-level ac generating circuit shown in FIG. 3 in the low voltage mode between 30 degrees and 90 degrees, wherein the phase A voltage is the positive maximal, the switch components Sa1 and Sa2 are normal off, the switch components Sa3 and Sa4 are normal on, the phase B voltage is the negative maximal, the switch components Sb3 and Sb4 are normal off, and the switch components Sb1 and Sb2 are normal on. Hence, the bus voltage Vbus is equal to the line voltage vab. The phase C voltage is between the phase A voltage and the phase B voltage, and the bridge arm is switched at high frequency. While vc>0, the switch component Sc1 is switched at high frequency, the switch component Sc2 is normal off, and the switch components Sc3 and Sc4 are normal on. While vc<0, the switch component is switched at high frequency, the switch component Sc3 is normal off, and the switch components Sc1 and Sc2 are normal on. Both the switch components S1 and S2 of the boosting circuit 31 are switched at high frequency, and the battery voltage (Vbat) is boosted to the bus voltage (Vbus=vab). The conditions between 30 degrees and 90 degrees are illustrated as follows.

The switch components S1 and S2 are switched at high frequency:

phase A: the switch components Sa1 and Sa2 are normal off, and the switch components Sa3 and Sa4 are normal on;

phase B: the switch components are normal off, and the switch components Sb1 and Sb2 are normal on; and phase C: while vc>0, the switch component Sc1 is switched at high frequency, the switch component Sc2 is normal off, and the switch components Sc3 and Sc4 are normal on; while vc<0, the switch component Sc4 is switched at high frequency, the switch component Sc3 is normal off, and the switch components Sc1 and Sc2 are normal on.

Similarly, the operation at other degrees can be realized.

According to above analyses, there are only three switch components in the low voltage mode at any time, so that the system efficiency is higher. The phase at which the inverting circuit 32 is switched at high frequency is near the zero-crossing of the output voltage current, so as to facilitate the reduction of the switch loss.

(3) Intermediate Voltage Mode

The intermediate voltage mode is between the high voltage mode and the low voltage mode. In this mode, the first boost-buck circuit 33 of the positive half portion and the second boost-buck circuit 34 of the negative half portion are operated in different modes, i.e. while the first boost-buck circuit 33 of the positive half portion is in the high voltage mode, the second boost-buck circuit 34 of the negative half portion is in the low voltage mode, or while the first-buck circuit 33 of the positive half portion is in the low voltage mode, the second boost-buck circuit 34 of the negative half portion is in the high voltage mode. Theoretically, to take account of the symmetry, the positive half portion and the negative half portion should be operated in similar mode; however, practically, while the input voltage is near the zero zone $$\left(Vbat = \left(\frac{3\sqrt{2}}{2} \sim \sqrt{6}\right)V_o,\right.$$

wherein Vo is the effective value of the phase voltage of the power grid; the zero zone is approximately 466-538 V while the voltage of the power grid is 220V), the positive and negative half portions might be operated in different modes. Hence, in combination with the operations in high voltage mode and the low voltage mode as previously described, while the first boost-buck circuit 33 of the positive half portion is in the high voltage mode and the second boost-buck circuit 34 of the negative half portion is in the low voltage mode, and the operation is between 30 degrees and 90 degrees, the operation in the intermediate voltage mode is illustrated as follows.

The first boost-buck circuit 33 of the positive half portion is in the high voltage mode (phase a and phase c):

The switch component S1 is normal on;

while vx>0, the switch component Sx1 is switched at high frequency, the switch component Sx2 is normal off, the switch components Sx3 and Sx4 are normal on, and x is equal to a and c respectively.

The second boost-buck circuit 34 of the negative half portion is in the low voltage mode (phase b):

The switch component S2 is switched at high frequency;

the switch components Sb3 and Sb4 are normal off, and the switch components Sb1 and Sb2 are normal on.

Similarly, the operation at other degrees can be realized. The operation at different degrees can be realized, wherein the first boost-buck circuit 33 of the positive half portion is in the low voltage mode, and the second boost-buck circuit 34 of the negative half portion is in the high voltage mode.

According to above analyses, in the intermediate voltage mode, there are also only three switch components are switched at high frequency, so as to achieve higher system efficiency.

There are at least three operation modes for the three-level ac generating circuit in the present invention. The three operation modes can be seamlessly switched by a control method, so that the system can be reliably operated while the input voltage varies in the wide range. Please refer to FIG. 7, which is a block diagram showing the control method according to the present invention, wherein the control circuit 70 is composed of the modulator 71 and the PWM producer 72.

Figure 7:
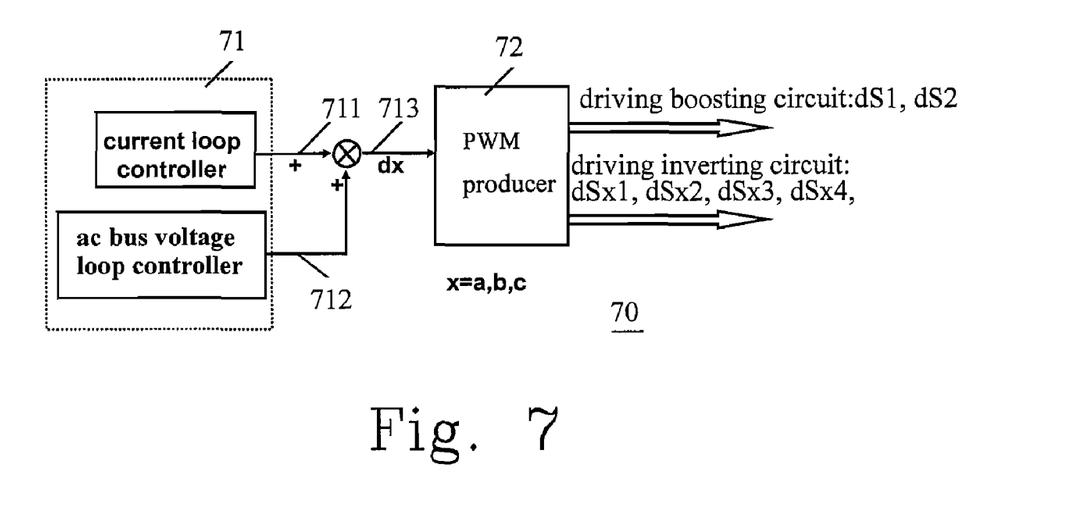
FIG. 7 is a block diagram showing the control method according to the present invention.

The modulator 71 is composed of the current loop controller and the dc bus voltage loop controller. The current loop controller is used for controlling the three-level current introduced into the power grid, so as to minimize the harmonic waves and maintain the higher output power. The voltage loop controller is used for controlling the positive and negative bus voltage (i.e. vp and vn) as the determined waves.

The output 711 of the current loop controller and the output 712 of the voltage loop controller are formed as the control signal dx of three-level switch components in the boosting circuit and the inverting circuit of the ac generating circuit. For safety, the dx is limited to be in a range, such as $-d_{limit} \leq dx \leq d_{limit}$.

According to the voltage polarity of the power grid and the circuit portion in operation, the ac generating circuit can be divided as the first boost-buck circuit of the positive half portion and the second boost-buck circuit of the negative half portion. While $dx \geq 0$, the property of the first boost-buck circuit of the positive half portion is controlled. While $dx \leq 0$, the property of the second boost-buck circuit of the negative half portion. According to the properties of the three-level inverting circuit, the da, db and dc are positive or negative. In the operation, the dx is processed corresponding to the positive and negative polarity and magnitude of the dx, so as to coordinate the boosting circuit portion and the inverting circuit portion of the three-level ac generating circuit, so that the three operation modes are seamlessly switched.

While the absolute value of the sum of the output 711 of the current loop controller and the output 712 of the voltage loop controller and the absolute value of the dx (x=a, b, c) are both smaller than 1, the normal output of the three-level is achieved by only the inverting circuit portion, and the three-level ac generating circuit is operated in the high voltage mode. The switch components S1 and S2 of the boosting circuit are normal on, and the switch components of the inverting circuit portion are controlled by the dx.

While the absolute values of the sum of the outputs 711 and 712 and the dx (x=a, b, c), the normal output of the three-level cannot be achieved by only the inverting circuit, and the three-level ac generating circuit must be operated in the low voltage mode. The input voltage is boosted by the boosting circuit portion, and then the normal output are achieved by the inverting circuit portion. The dx is processed corresponding to the duty cycle of the three-level ac generating circuit, i.e. the control signals of the switch components in the boosting circuit portion and the inverting circuit portion.

While the sum of the outputs 711 and 712 and the dx (x=a, b, c) have at least one positive value more than 1 and the absolute value of the negative value less than 1, or the absolute value of the negative value more than 1 and the positive value less than 1, the three-level ac generating circuit is operated in the intermediate voltage mode. The duty cycle process for the intermediate voltage mode can be easily achieved by combining the operation modes of the positive portion and the negative portion and the duty cycle processes of the high voltage mode and the low voltage mode.

According to the previous descriptions, while the input voltage is changed, the system can be seamless switches among different modes by the control method. The efficiency of the system in the range of the input voltage is higher due to the optimization of the operation modes.

In the present invention, for the capacitors Cp and Cn on the dc bus, the intermediate storage component is not necessary, so that the capacitor with the small capacity can be used. Since the storage component with the large capacity, such as the electrolytic capacitor is not necessary, the volume and the cost of the system are decreased, but also the reliability and the operation life are significantly increased.

It is to be noted that the dc input source in the present invention can be solar power generation system, a fuel battery, a wind power generation system and a regular battery. The three-level ac generating circuit and the control method thereof in the present invention can be used for the 3P3W system and the 3P4W system illustrates as follows.

Figure 8:
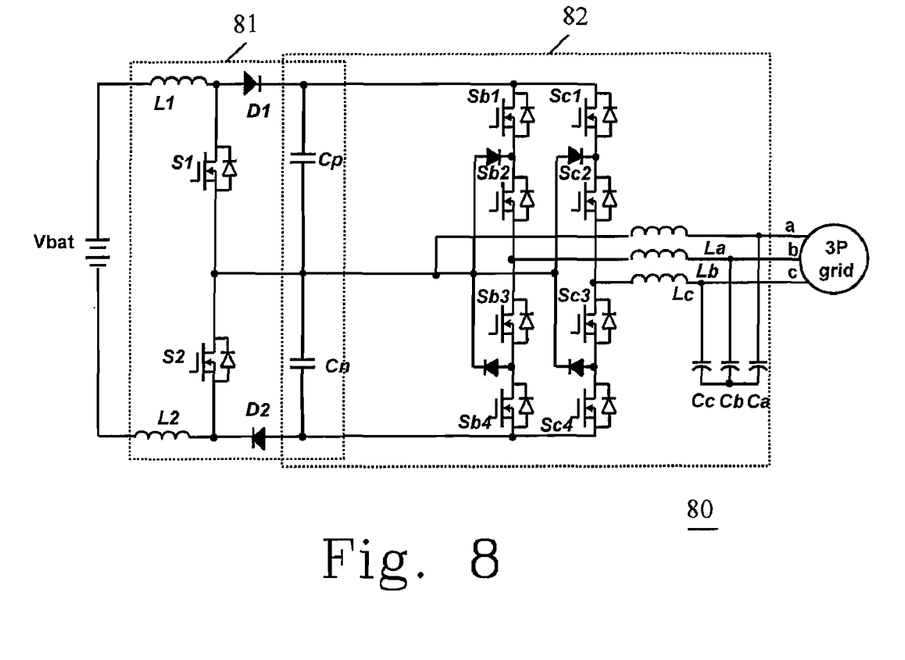
FIG. 8 shows the three-level ac generating circuit according to the second embodiment of the present invention.

Please refer to FIG. 8 showing the three-level ac generating circuit according to the second embodiment of the present invention, wherein the three-level ac generating circuit 80 is used in the 3P3W system. The boosting circuit 81 is the three-level boosting circuit, and the inverting circuit 82 is the dual-bridge arm three-level inverting circuit. Since only two phases of the current in the 3P3W system are independent, the third phase current is controlled by controlling the two phases of the current. The three phases of the current can be completely controlled by the dual-bridge arm inverting circuit.

Figure 9:
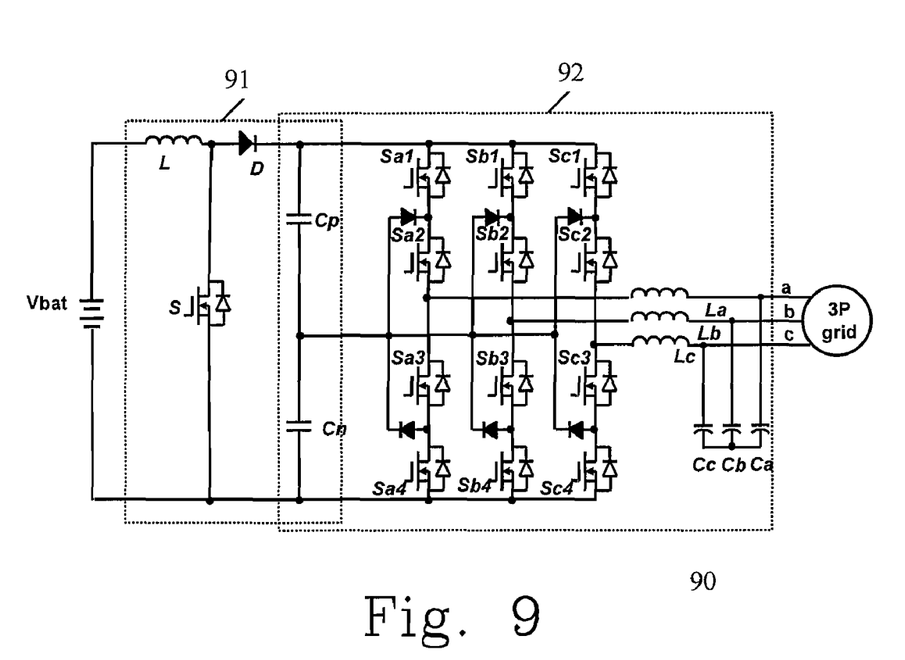
FIG. 9 shows the three-level ac generating circuit according to the third embodiment of the present invention.

Please refer to FIG. 9 showing the three-level ac generating circuit according to the third embodiment of the present invention, wherein the three-level ac generating circuit 90 is used for the 3P3W system. The boosting circuit 91 is the regular boosting circuit, and the inverting circuit 92 is the three-level inverting circuit. In this embodiment, the positive boosting circuit and the negative boosting circuit are the same portion.

Figure 10:
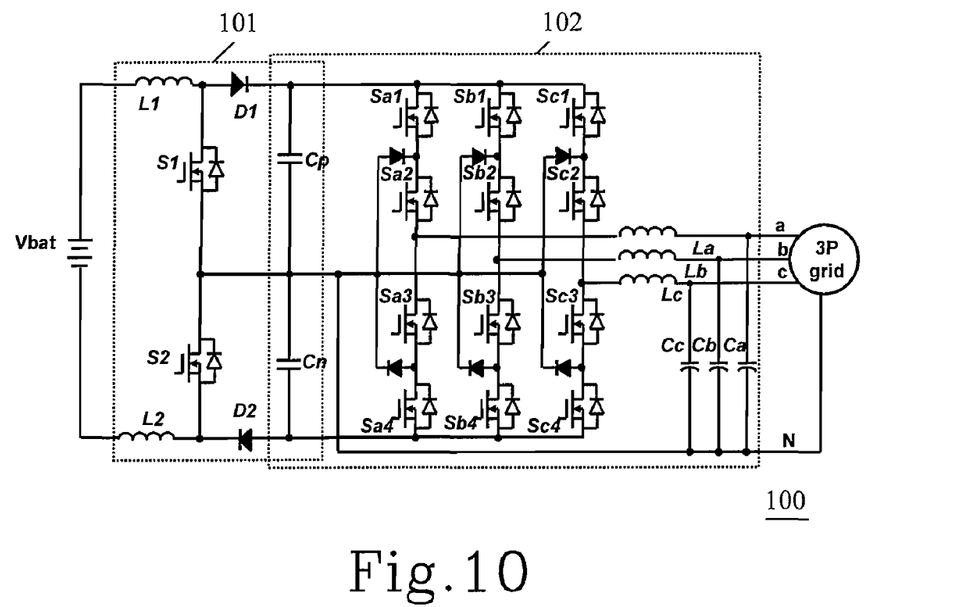
FIG. 10 shows the three-level ac generating circuit according to the fourth embodiment of the present invention.

Please refer to FIG. 10 showing the three-level ac generating circuit according to the fourth embodiment of the present invention, wherein the three-level ac generating circuit is used for the 3P4W system. The boosting circuit 101 is the three-level boosting circuit, and the inverting circuit 102 is the three-level inverting circuit. The second midpoint between the switch component S1 and the switch component S2 and the third midpoint between the capacitor Cp and the capacitor Cn are further connected to the three phase output.

Figure 11:
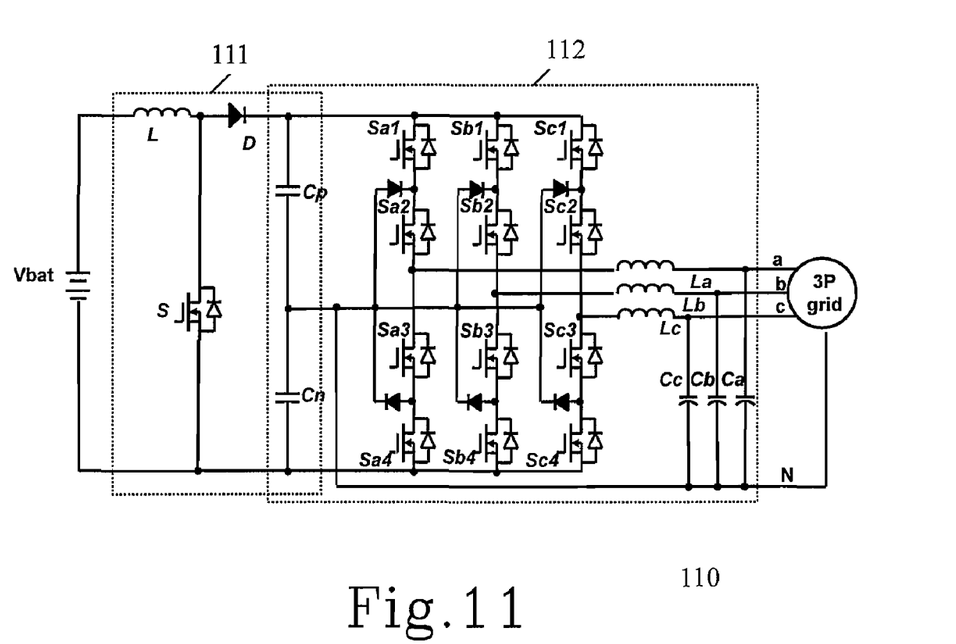
FIG. 11 shows the three-level ac generating circuit according to the fifth embodiment of the present invention.

Please refer to FIG. 11 showing the three-level ac generating circuit according to the fifth embodiment of the present invention, wherein the three-level ac generating circuit 110 is used for the 3P4W system. The boosting circuit 111 is the regular boosting circuit, and the inverting circuit 112 is the three-level inverting circuit.

Accordingly, the present invention provides a three-level ac generating circuit with high efficiency composed of a three-level boosting circuit and a three-level inverting circuit, wherein the MOSFET is used as the switch component in the inverting circuit so as to increase the efficiency of the inverting circuit. The three-level ac generating circuit of the present invention is very useful in wide range of the voltage variations.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is;

1. A three-level ac generating circuit, comprising:
    a three-level boosting circuit connected to an input source and including a positive boosting portion and a negative boosting portion; and
    a three-level inverting circuit connected to the three-level boosting circuit and including a positive inverting portion, a negative inverting portion and at least two inverters connected in parallel, wherein each inverter includes a first switch component and a second switch component connected in reversed series via a first midpoint, the first switch component has an end connected to a second midpoint between a first metal oxide semiconductor field effect transistor (MOSFET) and a second MOSFET, the second switch component has an end connected to a third midpoint between a third MOSFET and a fourth MOSFET, a fourth midpoint is between the second MOSFET and the third MOSFET and provides a single phase output, wherein while the input source is a relatively low voltage, the relatively low voltage is boosted via the three-level boosting circuit, and inverted and output via the three-level inverting circuit, while the input source is a relatively high voltage, the relatively high voltage is inverted and output via the three-level inverting circuit, and the output of the three-level ac generating circuit is a power grid.

2. The three-level ac generating circuit according to claim 1, wherein the three-level boosting circuit includes:
    at least one inductor connected to one of a high voltage end and a low voltage end of the input source;
    a third switch component and a fourth switch component connected in series via a fifth midpoint and connected to the at least one inductor; and
    a first capacitor and a second capacitor connected in series via a sixth midpoint and in parallel to the third switch component and the fourth switch component via a fifth switch component and a sixth switch component, wherein the fifth switch component is positioned opposite to the sixth switch component, and the fifth midpoint is connected to the sixth midpoint.

3. The three-level ac generating circuit according to claim 1, wherein the three-level boosting circuit is a regular boosting circuit.

4. The three-level ac generating circuit according to claim 1, wherein the three-level boosting circuit includes:
    a first inductor connected to a high voltage end of the input source;
    a third switch component having one end connected to the first inductor and having another end connected a low voltage end of the input source; and
    a first capacitor and a second capacitor connected in series via a fifth midpoint, and connected to the first inductor and the third switch component via a fourth switch component.

5. The three-level ac generating circuit according to claim 2, wherein the third switch component and the fourth switch component are metal oxide semiconductor field effect transistors, and the fifth switch component and the sixth switch component are diodes.

6. The three-level ac generating circuit according to the claim 1, wherein the three-level inverting circuit includes a first capacitor and a second capacitor connected in series via a sixth midpoint and the first midpoint is connected to the sixth midpoint.

7. The three-level ac generating circuit according to claim 6, wherein the first switch component and the second switch component are diodes.

8. The three-level ac generating circuit according to claim 6, wherein the fourth midpoint is further connected to a third inductor and a third capacitor.

9. The three-level ac generating circuit according to claim 1, being used in a 3P3W power system.

10. The three-level ac generating circuit according to claim 1, being used in a 3P4W power system.

11. The three-level ac generating circuit according to claim 10, wherein the fifth midpoint and the sixth midpoint are further connected to three phase output.

12. The three-level ac generating circuit according to claim 1, wherein the input source is one selected from a group consisting of a solar power generation system, a fuel battery, a wind power generation system and a regular battery.

13. The three-level ac generating circuit according to claim 1, wherein a first boost-buck circuit is composed of the positive boosting portion and the positive inverting portion for outputting a positive half circuit wave, and a second boost-buck circuit is composed of the negative boosting portion and the negative inverting portion for outputting a negative half circuit wave.

14. The three-level ac generating circuit according to claim 4, wherein the third switch component is metal oxide semiconductor field effect transistor, and the fourth switch component is diode.

15. A method for controlling a three-level ac generating circuit, wherein the three-level ac generating circuit comprises a three-level boosting circuit connected to an input source, including a positive boosting portion and a negative boosting portion and generating an output received by a power grid, and a three-level inverting circuit connected to the three-level boosting circuit and including a positive inverting portion, a negative inverting portion and an inductor, and the method comprises a step of causing a current flowing through the inductor having the same phase with a voltage of the power grid such that the three-level inverting circuit is continuously operated under an energy transportation mode.

16. A method according to claim 15, wherein the three-level inverting circuit further comprises a first capacitor and a second capacitor connected in series via a first midpoint, and at least two inverters connected in parallel, each inverter includes a first switch component and a second switch component connected in reversed series via a second midpoint, the first switch component has an end connected to a third midpoint between a third switch component and a fourth switch component, the second switch component has an end connected to a fourth midpoint between a fifth switch component and a sixth switch component, the second midpoint is connected to the first midpoint, a fifth midpoint is between the fourth switch component and the fifth switch component and provides a single phase output, and the method further comprises steps of:

switching the third switch component in a relatively high frequency; and turning on the fourth switch component and turning off the fifth and the sixth switch components when both of the voltage of the power grid and the current flowing through the inductor are larger than zero, wherein an energy is transported from the input end to the power grid and passes through the third and the fourth switch components and the inductor when the third switch is turned on, and the current flowing through the inductor flows continuously through the first switch component when the third switch is turned off.

17. A method according to claim 15, wherein the three-level inverting circuit further comprises a first capacitor and a second capacitor connected in series via a first midpoint, and at least two inverters connected in parallel, each inverter includes a first switch component and a second switch component connected in reversed series via a second midpoint, the first switch component has an end connected to a third midpoint between a third switch component and a fourth switch component, the second switch component has an end connected to a fourth midpoint between a fifth switch component and a sixth switch component, the second midpoint is connected to the first midpoint, a fifth midpoint is between the fourth switch component and the fifth switch component and provides a single phase output, and the method further comprises steps of:

switching the sixth switch component in a relatively high frequency; and turning on the fifth switch component and turning off the third and the fourth switch components when both of the voltage of the power grid and the current flowing through the inductor are less than zero, wherein an energy is transported from the input end to the power grid and passes through the fifth and the sixth switch components and the inductor when the sixth switch is turned on, and the current flowing through the inductor flows continuously through the second switch component when the sixth switch component is turned off.

18. A method according to claim 15, wherein the three-level boosting circuit comprises a seventh and a eighth switch components, while the input source is a relatively low voltage, the relatively low voltage is boosted via the three-level boosting circuit and inverted and output via the three-level inverting circuit, while the input source is a relatively high voltage, the relatively high voltage is inverted and output via the three-level inverting circuit, and the method further comprises a step of switching the seventh and the eighth switch components and the three-level inverting circuit in a relatively high frequency while the input source is the relatively low voltage.

19. A method according to claim 15, wherein the three-level ac generating circuit further comprises a first boost-buck circuit comprising the positive boosting portion and the positive inverting portion outputting a positive half circuit wave, and a second boost-buck circuit comprising the negative boosting portion and the negative inverting portion outputting a negative half circuit wave, and the method further comprises steps of:

detecting a current loop and a dc bus voltage loop of the three-level ac generating circuit for providing a control signal; and determining to control one of the first boost-buck circuit and the second boost-buck circuit by an impulse width modulation according to the control signal.

20. A method according to claim 15, wherein the three-level boosting circuit comprises a seventh and a eighth switch components, while the input source is a relatively low voltage, the relatively low voltage is boosted via the three-level boosting circuit and inverted and output via the three-level inverting circuit, while the input source is a relatively high voltage, the relatively high voltage is inverted and output via the three-level inverting circuit, and the method further comprises steps of:

turning off the seventh and the eighth switch components; and switching the three-level inverting circuit in a relatively high frequency while the input source is the relatively high voltage.

21. A method according to claim 19 further comprising a step of operating the first boost-buck circuit and the second boost-buck circuit in a boosting status and a step-down status respectively while the input voltage is switched between a relatively high voltage and a relatively low voltage.

* * * * *